United States Patent
Phan et al.

(10) Patent No.: US 10,611,481 B1
(45) Date of Patent: Apr. 7, 2020

(54) PASSENGER CHAIR COMPONENT MONITORING SYSTEM

(71) Applicant: Rockwell Collins, Inc., Cedar Rapids, IA (US)

(72) Inventors: Thao Phan, Clemmons, NC (US); Daniel Udriste, Winston-Salem, NC (US); Christopher Ciemier, Odenton, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/135,157

(22) Filed: Sep. 19, 2018

(51) Int. Cl.
*H04N 21/214* (2011.01)
*B64D 11/00* (2006.01)
*B64D 11/06* (2006.01)

(52) U.S. Cl.
CPC .. *B64D 11/00155* (2014.12); *B64D 11/00151* (2014.12); *B64D 11/0624* (2014.12); *H04N 21/2146* (2013.01)

(58) Field of Classification Search
CPC ........ B64D 11/00155; B64D 11/00151; B64D 11/0624; H04N 21/2146; H04N 7/18; H04L 29/08; H04L 29/06
See application file for complete search history.

(56) References Cited

U.S. PATENT DOCUMENTS

| | | | | |
|---|---|---|---|---|
| 6,757,712 | B1* | 6/2004 | Bastian | B64D 11/0015 709/203 |
| 2002/0138625 | A1* | 9/2002 | Bruner | H04L 29/06 709/227 |
| 2003/0114178 | A1 | 6/2003 | Chapelle et al. | |
| 2003/0217363 | A1* | 11/2003 | Brady, Jr. | H04L 29/06 725/76 |
| 2005/0273662 | A1* | 12/2005 | Yi | G06F 11/0739 714/31 |
| 2006/0143661 | A1 | 6/2006 | Funderburk et al. | |
| 2010/0060739 | A1 | 3/2010 | Salazar | |

(Continued)

FOREIGN PATENT DOCUMENTS

EP 3241748 A1 11/2017
WO 2018140659 A1 8/2018

OTHER PUBLICATIONS

Extended European Search Report dated Feb. 13, 2020 for EP Application No. 19197718.0.

*Primary Examiner* — Dong-Chang Shiue
(74) *Attorney, Agent, or Firm* — Suiter Swantz pc llo (57) ABSTRACT

A system for monitoring passenger chair components is disclosed. In embodiments, the system includes a seat control module communicatively coupled with one or more components of a passenger chair. The system may further include an inflight entertainment unit communicatively coupled to the seat control module. The inflight entertainment unit can be configured to receive diagnostic and usage information associated with the one or more components from the seat control module. The system may further include an aircraft server communicatively coupled to the seat control module and/or to the inflight entertainment unit. The aircraft server can be configured to receive the diagnostic and usage information from the seat control module and/or the inflight entertainment unit, and can be further configured to transmit the diagnostic and usage information to a ground server.

15 Claims, 5 Drawing Sheets

(56) References Cited

U.S. PATENT DOCUMENTS

| | | |
|---|---|---|
| 2013/0317704 A1 | 11/2013 | Fischer et al. |
| 2014/0172242 A1 | 6/2014 | Fruhwald et al. |
| 2015/0242765 A1* | 8/2015 | Muirhead .......... B64D 11/0015 705/5 |

* cited by examiner

PASSENGER CHAIR COMPONENT MONITORING SYSTEM

BACKGROUND

Vehicles for mass transport can include, but are not limited to, aircrafts, boats, trains, and busses. The passenger cabins in these types of vehicles are typically designed for long travel durations (e.g., one or more hours of travel). As such, the passenger cabins can include reclining chairs that allow passengers to rest or sleep comfortably during travel.

Passenger chairs can include mechanical linkages that allow the chairs to recline or reposition and possibly one or more actuators (e.g., electric motors, pneumatic linear actuators, or the like) that assist with reclining or repositioning processes. Because of the increasingly complex mechanical linkages, actuators, and/or electrical elements built into such chairs, there is a need for systems and methods of monitoring the passenger chair components for fault detection, isolation, repair, and/or prevention.

SUMMARY

In one aspect, embodiments of the inventive concepts disclosed herein are directed to a system for monitoring passenger chair components. In embodiments, the system includes a seat control module communicatively coupled with one or more components of a passenger chair. The system may further include an inflight entertainment unit communicatively coupled to the seat control module. The inflight entertainment unit can be configured to receive diagnostic and usage information associated with the one or more components from the seat control module. The system may further include an aircraft server communicatively coupled to the seat control module and/or to the inflight entertainment unit. The aircraft server can be configured to receive the diagnostic and usage information from the seat control module and/or the inflight entertainment unit, and can be further configured to transmit the diagnostic and usage information to a ground server.

In embodiments, the system can include a plurality of seat control modules communicatively coupled with components of respective passenger chairs. The system may also include a plurality of inflight entertainment units communicatively coupled to respective ones of the seat control modules. The inflight entertainment units can be configured to receive diagnostic and usage information associated with the components from the (respective) seat control modules. The aircraft server communicatively coupled to the seat control modules and/or the inflight entertainment units. The aircraft server can be configured to receive the diagnostic and usage information from the seat control modules and/or the inflight entertainment units, and can be further configured to transmit the diagnostic and usage information to a ground server.

In another aspect, embodiments of the inventive concepts disclosed herein are directed to a method of monitoring passenger chair components. In implementations of the method, diagnostic and usage information is collected from a plurality of seat control modules communicatively coupled with components of respective passenger chairs. The diagnostic and usage information can be permanently or temporarily stored on an aircraft server and then transmitted from the aircraft server to a ground server. In some implementations, the ground server may be configured to generate an alert and/or instruction based on the diagnostic and usage information.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for monitoring passenger chair components and reporting diagnostic and usage information (e.g., faults, test data, use data, or the like) to a remote server (e.g., ground server). Passenger chairs in aircrafts and other vehicles are incorporating increasingly complex structures that include mechanical linkages, actuators, and/or electrical elements for reclining and/or repositioning the chairs. These components may fail over time, either from wearing down or due to damage (e.g., from an impact or from exposure to debris or moisture). Consequently, there is a need for systems and methods of monitoring the passenger chair components for fault detection, isolation, repair, and/or prevention. Systems and methods for monitoring passenger chair components are disclosed herein and are described with reference to example embodiments illustrated in FIGS. 1 through 5.

Figure 1:
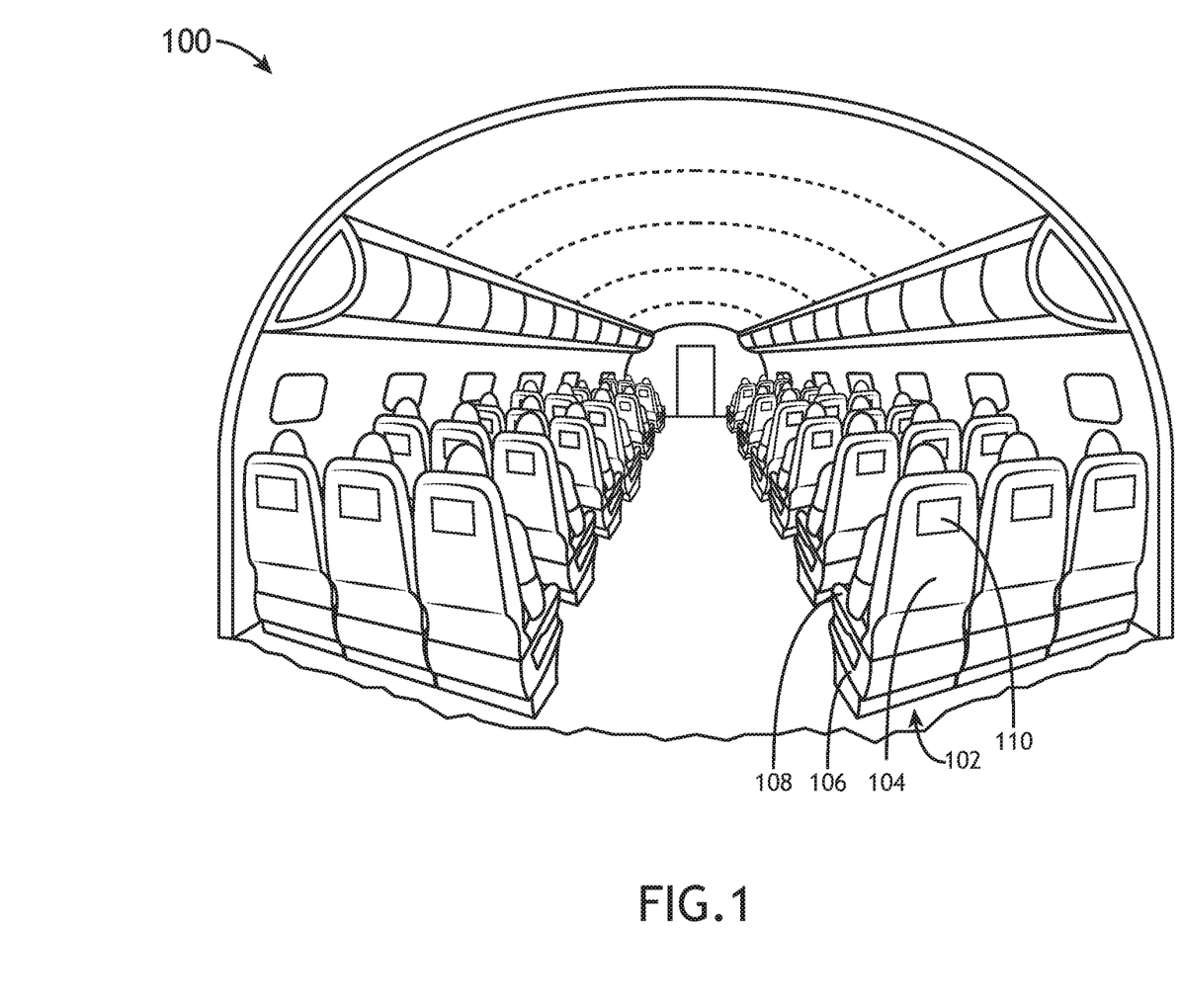
FIG. 1 illustrates an example environment in which a system for monitoring passenger chair components can be employed, in accordance with an example embodiment of this disclosure.

FIG. 1 illustrates an example environment 100 (e.g., an aircraft cabin) that includes a plurality of passenger chairs 102. In embodiments, a passenger chair 102 includes an upper body support member 104 (e.g., a backrest) and a seat 106. In some embodiments, the upper body support member 104 and the seat 106 may be separate structures disposed adjacent to one another. Alternatively, the upper body support member 104 and the seat 106 can have one or more shared components. For example, the upper body support member 104 and the seat 106 can have a shared cushion or covering, one or more shared mechanical linkages, and/or one or more shared actuators. The upper body support member 104 may be configured to move relative to the seat 106. For example, the upper body support member 104 can be configured to transition between upright and reclined positions. In some embodiments, the seat 106 is also repositionable. For example, the seat 106 may be configured to move forward/backward, upward/downward, and/or tilt. The seat 106 and the upper body support member 104 may be simultaneously actuated to transition from a sitting to a laying position. For example, the seat 106 may actuate forwards while the upper body support member 104 reclines to place the passenger chair 102 in a bed-like configuration. In some embodiments, the passenger chair 102 can also include one or more armrests 108 or armrest consoles adjacent to (e.g., on a left or right side) of the seat 106.

The passenger chairs 102 (or a group of passenger chairs 102) can have respective inflight entertainment (IFE) devices 110. For example, each passenger chair 102 may have an IFE unit 110 embedded within a portion of the passenger chair 102 (e.g., within the backrest), stowed within the armrest 108, or coupled to or stowed within another fixture or wall structure that is in viewing range of the passenger chair 102. In some embodiments, a group of two or more passenger chairs 102 have access to a shared IFE unit 110. The IFE devices 110 may include a media display devices (e.g., a LCDs, LED displays, OLED displays, or the like) for viewing streamed or recorded content (e.g., TV shows, movies, etc.), travel updates (e.g., flight tracking map, altitude, speed, outside air temperature, distance/time to destination, weather updates, or the like). An IFE unit 110 for a passenger chair 102 may be integrated (e.g., at least partially embedded) within or coupled to the passenger chair 102, another passenger chair (e.g., within a backrest of another passenger chair 102 in front of the passenger chair), a wall structure, a console, or the like. The IFE devices 110 can also include audio output devices (e.g., speakers, audio output jacks, and/or wireless transmitters (e.g., Bluetooth audio transmitters)). In some embodiments, the IFE devices 110 include touchscreen displays or other user input devices that can be used to navigate the IFE device menus, play, pause, stop, fast forward, and/or rewind, and/or interact with game media (e.g., video games, trivia games, etc.).

Figure 2:
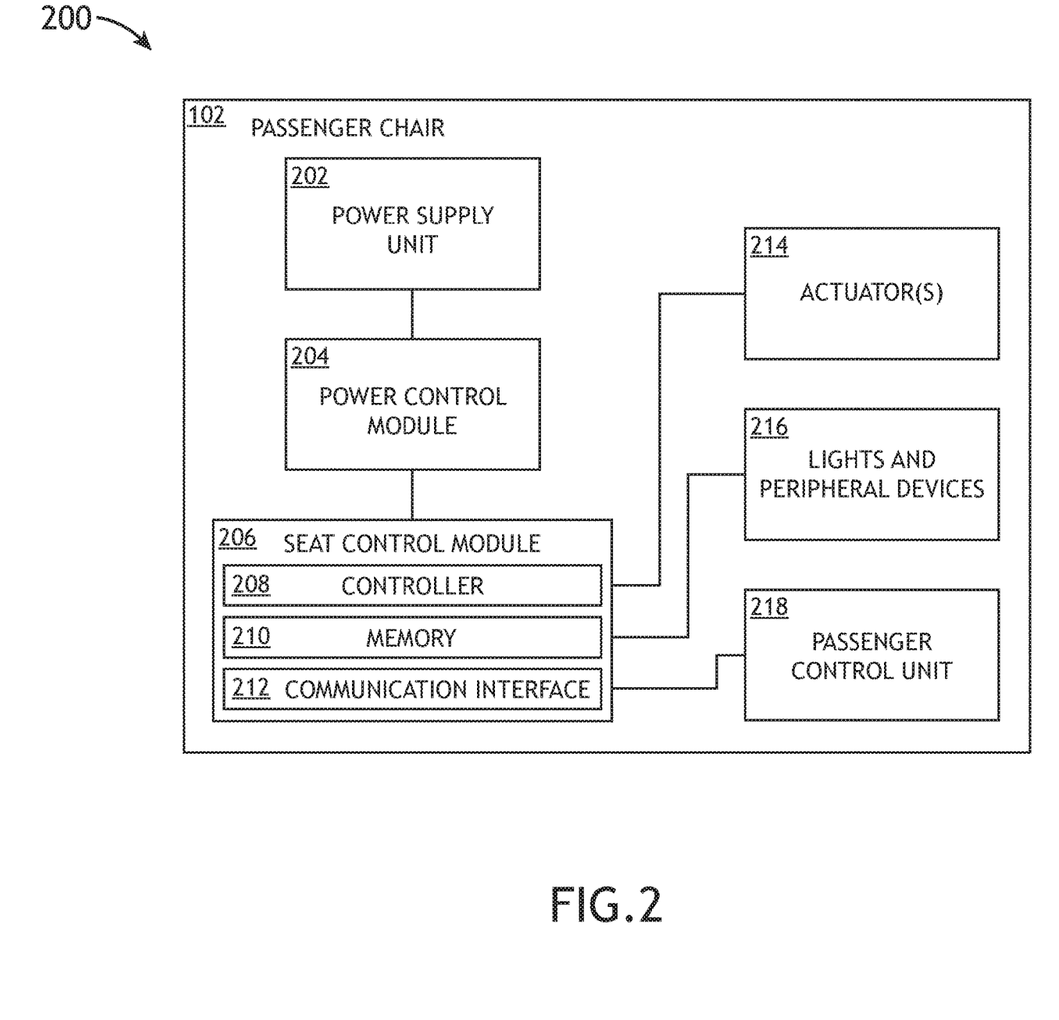
FIG. 2 is a block diagram illustrating a system of electronic components for a passenger chair, in accordance with an example embodiment of this disclosure.

A system 200 of electronic components for a passenger chair 102 is illustrated in FIG. 2, in accordance with an example embodiment of this disclosure. The system 200 can include a power supply unit (PSU) 202 configured to receive electrical power from a power source (e.g., electrical outlet, battery, or the like). A power control module (PCM) 204 may be coupled to the PSU 202 and configured to distribute electrical power from the PSU 202 to electrical components of the passenger chair 102. For example, the PCM 204 can distribute electrical power from the PSU 202 to a seat control module 206, one or more actuator(s) 214 (e.g., electrical motors, servos, and/or linear actuators for repositioning the seat 106, upper body support member 104, headrest, and/or any other actuatable components), lights and/or peripheral devices 216 (e.g., reading lights, personal ambient lighting, fan(s), automated window shades, or other passenger accessible electronic devices), and/or a passenger control unit 218 (e.g., mechanical user interface controls, capacitive touch or other pressure/proximity based user interface, and/or any other input device that enables the passenger to control the actuator(s) 214, lights and/or peripheral devices 216, IFE unit 110, and/or any other electronic component accessible to the passenger). The PCM 204 may be configured to directly power the one or more actuators 214, lights and/or peripheral devices 216, and/or passenger control unit 218. In some embodiments, the PCM 214 is configured to indirectly power one or more of the components by powering the seat control module 206, which in turn powers one or more of the one or more actuators 214, lights and/or peripheral devices 216, and/or passenger control unit 218.

The seat control module 206 is configured to control the one or more actuators 214, lights and/or peripheral devices 216, and/or passenger control unit 218. For example, the seat control module 206 can be configured to send control signals to the one or more actuators 214 or the lights and/or peripheral devices 216 (e.g., based on default or preprogrammed settings (e.g., takeoff/landing settings) or based on passenger inputs that are entered via the passenger control unit 218). The seat control module 206 can also be configured to collect data including, but not limited to, inputs received via the passenger control unit 218 and/or current settings or diagnostic data (e.g., test data, fault data, etc.) received from the one or more actuators 214 or the lights and/or peripheral devices 216.

In embodiments, the seat control module 206 includes a controller 208, memory 210, and communication interface 212. The controller 208 provides processing functionality for at least the seat control module 206 and can include any number of processors, micro-controllers, circuitry, field programmable gate array (FPGA) or other processing systems, and resident or external memory for storing data, executable code, and other information accessed or generated by the seat control module 206. The controller 208 can execute one or more software programs embodied in a non-transitory computer readable medium (e.g., memory 210) that implement techniques described herein. The controller 208 is not limited by the materials from which it is formed or the processing mechanisms employed therein and, as such, can be implemented via semiconductor(s) and/or transistors (e.g., using electronic integrated circuit (IC) components), or the like.

The memory 210 can be an example of tangible, computer-readable storage medium that provides storage functionality to store various data and/or program code associated with operation of the seat control module 206/controller 208, such as software programs and/or code segments, or other data to instruct the controller 208, and possibly other components of the seat control module 206/system 200, to perform the functionality described herein. Thus, the memory 210 can store data, such as a program of instructions for operating the seat control module 206/system 200, including its components (e.g., controller 208, communication interface 212, actuator(s) 214, lights and/or peripheral devices 216, etc.). It should be noted that while a single memory 210 is described, a wide variety of types and combinations of memory (e.g., tangible, non-transitory memory) can be employed. The memory 210 can be integral with the controller 208, can comprise stand-alone memory, or can be a combination of both. Some examples of the memory 210 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, or the like.

The communication interface 212 can be operatively configured to communicate with components of the seat control module 206. For example, the communication interface 212 can be configured to retrieve data from the controller 208 or other devices (e.g., PCM 204, actuator(s) 214, lights and/or peripheral devices 216, passenger control unit 218, etc.), transmit data for storage in the memory 210, retrieve data from storage in the memory 210, and so forth. The communication interface 212 can also be communicatively coupled with the controller 208 to facilitate data transfer between components of the seat control module 206/system 200 and the controller 208. It should be noted that while the communication interface 212 is described as a component of the seat control module 206, one or more components of the communication interface 212 can be implemented as external components communicatively coupled to the seat control module 206 via a wired and/or wireless connection. The seat control module 206 can also include and/or connect to one or more input/output (I/O) devices (e.g., via the communication interface 212), such as the passenger control unit 218 or any other I/O device (e.g., a mouse, a trackball, a trackpad, a joystick, a line select device, a touchpad, a touchscreen, a keyboard, a keypad, a microphone (e.g., for voice commands), or the like). In embodiments, the communication interface 212 includes or is coupled to a transmitter, receiver, transceiver, physical connection interface, or any combination thereof.

Figure 3:
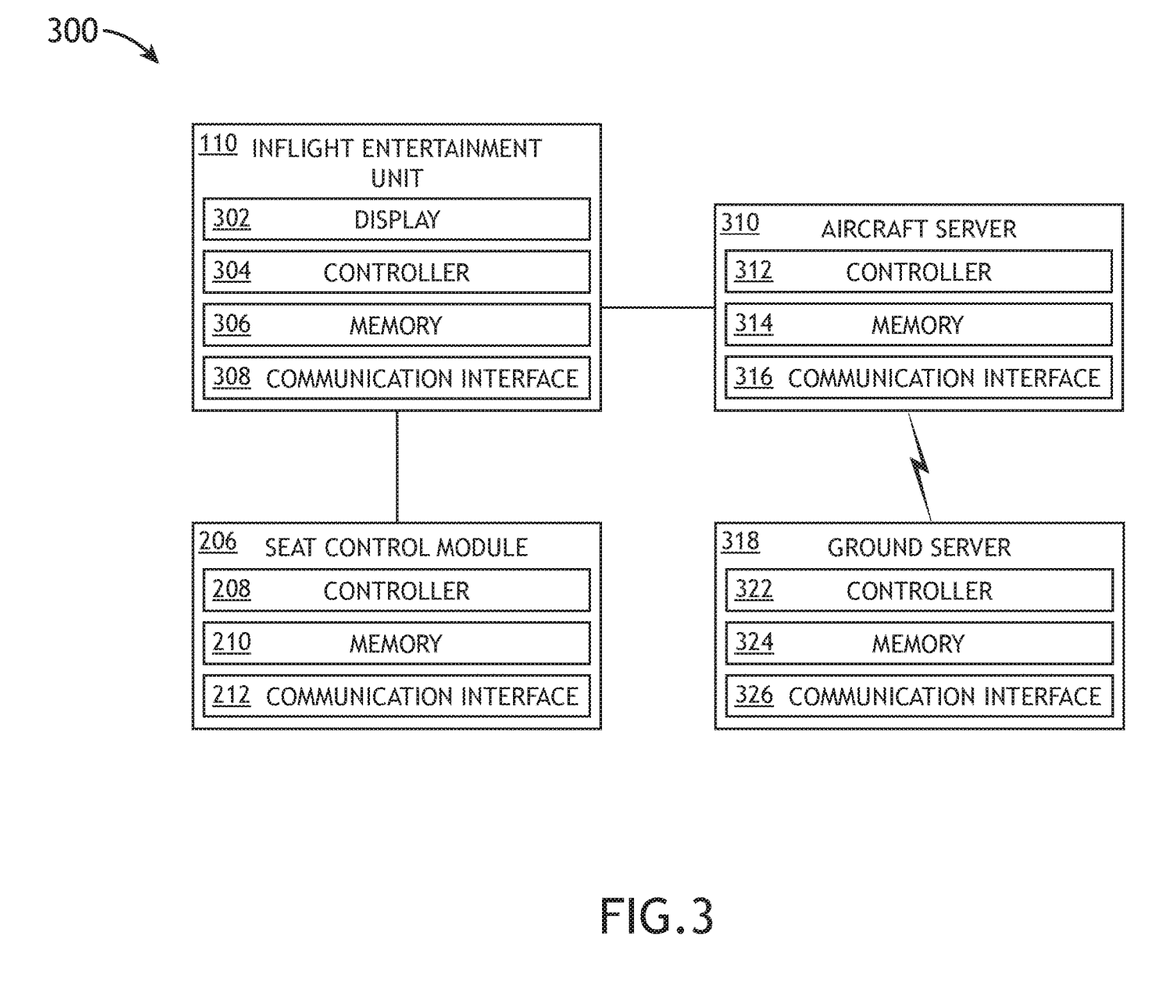
FIG. 3 is a block diagram illustrating a system for monitoring passenger chair components, in accordance with an example embodiment of this disclosure.
Figure 4:
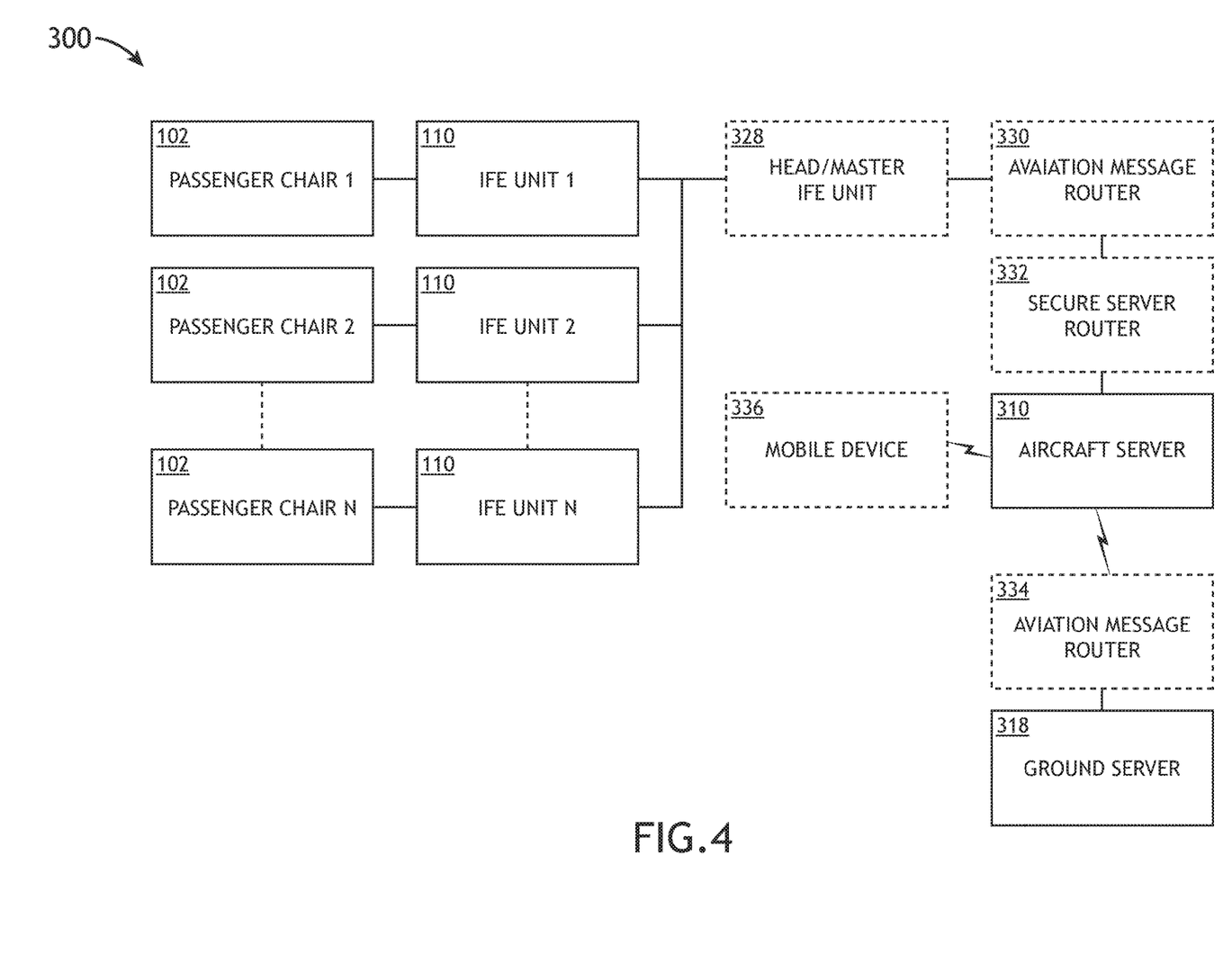
FIG. 4 is a block diagram illustrating a system for monitoring passenger chair components, in accordance with an example embodiment of this disclosure.

FIGS. 3 and 4 illustrate example embodiments of a system 300 for monitoring components (e.g., PSU 202, PCM 204, seat control module 206, actuator(s) 214, lights and/or peripheral devices 216, passenger control unit 218, etc.) of passenger chairs 102 and reporting diagnostic and usage information to a ground server 318. Examples of diagnostic and usage information that can be collected and reported include, but are not limited to, errors/faults (e.g., no signal detected, actuator/positioning errors, power instability, non-functioning lights and/or peripheral device, etc.), test data, settings, user preferences, and/or usage information (e.g., settings, preferences, inputs, and/or actions) collected over time.

As shown in FIG. 3, the communication interface 212 may facilitate connectivity between the seat control module 206 and an IFE unit 110. For example, the communication interface 212 can be configured to communicate directly with the IFE unit 110 (e.g., via an ad-hoc connection), or may be configured to communicate with the IFE unit 110 over a network (e.g., a wired/wireless network). In some embodiments, the seat control module 206 is configured to communicate with an IFE unit 110 that is integrated (e.g., at least partially embedded) within the passenger chair 110, coupled to the passenger chair 110, or integrated within or coupled to another structure (e.g., a console, another chair, a wall structure, or a fixture) that is in proximity to the passenger chair 110 (e.g., in viewing range of the passenger chair 110, such as, but not limited to, the backrest of another passenger chair that is directly in front of the passenger chair 110).

In embodiments, the IFE unit 110 includes a display 302 and/or an audio output device. The IFE unit 110 can also include a respective controller 304, memory 306, and communication interface 308. The controller 304 provides processing functionality for at least the IFE unit 110 and can include any number of processors, micro-controllers, circuitry, field programmable gate array (FPGA) or other processing systems, and resident or external memory for storing data, executable code, and other information accessed or generated by the IFE unit 110. The controller 304 can execute one or more software programs embodied in a non-transitory computer readable medium (e.g., memory 306) that implement techniques described herein. The controller 304 is not limited by the materials from which it is formed or the processing mechanisms employed therein and, as such, can be implemented via semiconductor(s) and/or transistors (e.g., using electronic integrated circuit (IC) components), or the like.

The memory 306 can be an example of tangible, computer-readable storage medium that provides storage functionality to store various data and/or program code associated with operation of the IFE unit 110/controller 304, such as software programs and/or code segments, or other data to instruct the controller 304, and possibly other components of the IFE unit 110, to perform the functionality described herein. Thus, the memory 306 can store data, such as a program of instructions for operating the IFE unit 110, including its components (e.g., display 302, controller 304, communication interface 308, etc.). It should be noted that while a single memory 306 is described, a wide variety of types and combinations of memory (e.g., tangible, non-transitory memory) can be employed. The memory 306 can be integral with the controller 304, can comprise stand-alone memory, or can be a combination of both. Some examples of the memory 306 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, or the like.

The communication interface 308 can be operatively configured to communicate with components of the IFE unit 110. For example, the communication interface 308 can be configured to retrieve data from the controller 304 or other devices (e.g., seat control module 206, aircraft server 310, and/or another IFE unit (e.g., master/slave IFE unit)), transmit data for storage in the memory 306, retrieve data from storage in the memory 306, and so forth. The communication interface 308 can also be communicatively coupled with the controller 304 to facilitate data transfer between components of the IFE unit 110 and the controller 304. It should be noted that while the communication interface 308 is described as a component of the IFE unit 110, one or more components of the communication interface 308 can be implemented as external components communicatively coupled to the IFE unit 110 via a wired and/or wireless connection. The IFE unit 110 can also include and/or connect to one or more input/output (I/O) devices (e.g., via the communication interface 308), such as display 302, the passenger control unit 218, or any other I/O device (e.g., a mouse, a trackball, a trackpad, a joystick, a line select device, a touchpad, a touchscreen, a keyboard, a keypad, a microphone (e.g., for voice commands), or the like). In embodiments, the communication interface 308 includes or is coupled to a transmitter, receiver, transceiver, physical connection interface, or any combination thereof.

The communication interface 308 may facilitate connectivity between the IFE unit 110 and an aircraft server 310. For example, the communication interface 308 can be configured to communicate directly with the aircraft server 310 (e.g., via an ad-hoc connection), or may be configured to communicate with the aircraft server 310 over a network (e.g., a wired/wireless network). The communication interface 308 may facilitate connectivity between the IFE unit 110 and a ground server 318. For example, the communication interface 308 can be configured to receive wireless communications from the ground server 318 (e.g., over an internet connection, cellular communications link, satellite communications link, or the like). In embodiments, the connectivity between the IFE unit 110 and the ground server 318 is established by the aircraft server 310. For example, the aircraft server 310 can be configured to communicate information received from the IFE unit 110 (e.g., diagnostic and usage information received from one or more seat control modules 206) to the ground server 318.

In embodiments, the aircraft server 310 includes a controller 312, memory 314, and a communication interface 316. The controller 312 provides processing functionality for at least the aircraft server 310 and can include any number of processors, micro-controllers, circuitry, field programmable gate array (FPGA) or other processing systems, and resident or external memory for storing data, executable code, and other information accessed or generated by the aircraft server 310. The controller 312 can execute one or more software programs embodied in a non-transitory computer readable medium (e.g., memory 314) that implement techniques described herein. The controller 312 is not limited by the materials from which it is formed or the processing mechanisms employed therein and, as such, can be implemented via semiconductor(s) and/or transistors (e.g., using electronic integrated circuit (IC) components), or the like.

The memory 314 can be an example of tangible, computer-readable storage medium that provides storage functionality to store various data and/or program code associated with operation of the aircraft server 310/controller 312, such as software programs and/or code segments, or other data to instruct the controller 312, and possibly other components of the aircraft server 310, to perform the functionality described herein. Thus, the memory 314 can store data, such as a program of instructions for operating the aircraft server 310, including its components (e.g., controller 312, communication interface 316, etc.). It should be noted that while a single memory 314 is described, a wide variety of types and combinations of memory (e.g., tangible, non-transitory memory) can be employed. The memory 314 can be integral with the controller 312, can comprise stand-alone memory, or can be a combination of both. Some examples of the memory 314 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, or the like.

The communication interface 316 can be operatively configured to communicate with components of the aircraft server 310. For example, the communication interface 316 can be configured to retrieve data from the controller 312 or other devices (e.g., IFE unit(s) 110, ground server 318, etc.), transmit data for storage in the memory 314, retrieve data from storage in the memory 314, and so forth. The communication interface 316 can also be communicatively coupled with the controller 312 to facilitate data transfer between components of the aircraft server 310 and the controller 312. It should be noted that while the communication interface 316 is described as a component of the aircraft server 310, one or more components of the communication interface 316 can be implemented as external components communicatively coupled to the aircraft server 310 via a wired and/or wireless connection. The aircraft server 310 can also include and/or connect to one or more input/output (I/O) devices (e.g., via the communication interface 316), such as a display, a mouse, a trackball, a trackpad, a joystick, a line select device, a touchpad, a touchscreen, a keyboard, a keypad, a microphone (e.g., for voice commands), or the like. In embodiments, the communication interface 316 includes or is coupled to a transmitter, receiver, transceiver, physical connection interface, or any combination thereof.

In embodiments, the ground server 318 also includes a controller 322, memory 324, and a communication interface 326. The controller 322 provides processing functionality for at least the ground server 318 and can include any number of processors, micro-controllers, circuitry, field programmable gate array (FPGA) or other processing systems, and resident or external memory for storing data, executable code, and other information accessed or generated by the ground server 318. The controller 322 can execute one or more software programs embodied in a non-transitory computer readable medium (e.g., memory 324) that implement techniques described herein. The controller 322 is not limited by the materials from which it is formed or the processing mechanisms employed therein and, as such, can be implemented via semiconductor(s) and/or transistors (e.g., using electronic integrated circuit (IC) components), or the like.

The memory 324 can be an example of tangible, computer-readable storage medium that provides storage functionality to store various data and/or program code associated with operation of the ground server 318/controller 322, such as software programs and/or code segments, or other data to instruct the controller 322, and possibly other components of the ground server 318, to perform the functionality described herein. Thus, the memory 324 can store data, such as a program of instructions for operating the ground server 318, including its components (e.g., controller 322, communication interface 326, etc.). It should be noted that while a single memory 324 is described, a wide variety of types and combinations of memory (e.g., tangible, non-transitory memory) can be employed. The memory 324 can be integral with the controller 322, can comprise stand-alone memory, or can be a combination of both. Some examples of the memory 324 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, or the like.

The communication interface 326 can be operatively configured to communicate with components of the ground server 318. For example, the communication interface 326 can be configured to retrieve data from the controller 322 or other devices (e.g., aircraft server 310), transmit data for storage in the memory 324, retrieve data from storage in the memory 324, and so forth. The communication interface 326 can also be communicatively coupled with the controller 322 to facilitate data transfer between components of the ground server 318 and the controller 322. It should be noted that while the communication interface 326 is described as a component of the ground server 318, one or more components of the communication interface 326 can be implemented as external components communicatively coupled to the ground server 318 via a wired and/or wireless connection. The ground server 318 can also include and/or connect to one or more input/output (I/O) devices (e.g., via the communication interface 326), such as a display, a mouse, a trackball, a trackpad, a joystick, a line select device, a touchpad, a touchscreen, a keyboard, a keypad, a microphone (e.g., for voice commands), or the like. In embodiments, the communication interface 326 includes or is coupled to a transmitter, receiver, transceiver, physical connection interface, or any combination thereof.

In embodiments, the seat control module 206 is configured to collect diagnostic and usage information from one or more components (e.g., PSU 202, PCM 204, the seat control module 206 itself, actuator(s) 214, lights and/or peripheral devices 216, passenger control unit 218, any combination thereof, etc.) of a respective passenger chair 102. The seat control module 206 is configured to transmit the diagnostic and usage information (e.g., faults, errors, test data, usage data (e.g., usage statistics), user settings/preferences, current settings, any combination thereof, etc.) to a respective IFE unit 110 that is communicatively coupled to the seat control module 206. In some embodiments, the IFE unit 110 is configured to receive information from one seat control module 206. In other embodiments, the IFE unit 110 may be configured to receive information from two or more seat control modules 206, for example, where the IFE unit 110 is configured to be viewed and/or accessed by a group of passengers. The seat control module 206 may be configured to periodically push (e.g., transmit) diagnostic and usage information to the IFE unit 110. The seat control module 206 can also (or alternatively) be configured to transmit diagnostic and usage information to the IFE unit 110 based upon a schedule, in response to triggering event (e.g., startup, restart, detected error/fault), and/or in response to a query/request for information from the IFE unit 110 or a query/request received via the IFE unit 110 (e.g., a query/request from the aircraft server 310 and/or the ground server 318).

The aircraft server 310 is configured to receive diagnostic and usage information collected by one or more IFE units 110 from respective seat control modules 206 or respective groups of seat control modules 206. For example, the one or more IFE units 110 can be configured to transmit the diagnostic and usage information (e.g., faults, errors, test data, usage data (e.g., usage statistics), user settings/preferences, current settings, any combination thereof, etc.) to the aircraft server 310 periodically, based upon a schedule, in response to triggering event (e.g., startup, restart, detected error/fault), and/or in response to a query/request received from the aircraft server 310 or received via the aircraft server 310 (e.g., from the ground server 318).

As shown in FIG. 4, in some embodiments, the one or more IFE units 110 are communicatively coupled to the aircraft server 310 via secure server router 332. In some embodiments, the system 300 further includes an aviation message router 330 for communications between the IFE units 110 and the aircraft server 310 and/or communications between the aircraft server 310 and the ground server 318, which may be communicatively coupled to another aviation message router 334. Aviation message router 330 and aviation message router 334 may include trusted labelers that attach a label, certificate, or security code to the communications, or embed the label, certificate, or security code within the communications, transmitted from the aircraft server 310 to the ground server 318, or vice versa. In other embodiments, the aviation message routers 330 and 334 are configured to encode or encrypt the communications and/or transmit the communications in a trusted format. In some embodiments, the aviation message router 330 utilizes the secure server router 332 for air/ground connectivity (e.g., for communication with the ground server 318 and/or for onboard communications).

In some embodiments, the system 300 includes a plurality of IFE units 110 that are configured to collect diagnostic and usage information from the seat control modules 206 of respective passenger chairs 102 and/or groups of passenger chairs 102. The IFE units 110 can then independently transmit the collected diagnostic and usage information to the aircraft server 310. Alternatively, one of the IFE units 110 can be a head/master IFE unit (e.g., IFE unit 328) that is configured to receive the diagnostic and usage information collected by the other IFE units 110 and transmit the diagnostic and usage information (possibly including the diagnostic and usage information that the head/master IFE unit 328 itself collected) to the aircraft server 310.

After collecting diagnostic and usage information from the one or more IFE units 110, or from the seat control modules 206 themselves, the aircraft server 310 is configured to transmit the diagnostic and usage information to the ground server 318. For example, the aircraft server 310 can be configured to transmit the diagnostic and usage information (e.g., faults, errors, test data, usage data (e.g., usage statistics), user settings/preferences, current settings, any combination thereof, etc.) to the ground server 318 periodically, based upon a schedule, in response to triggering event (e.g., startup, restart, detected error/fault), and/or in response to a query/request received from the ground server 318. The ground server 318 may be configured to maintain a log or database that is updated based upon the diagnostic and usage information received from the aircraft server 310. In embodiments, the ground server 318 can also be configured to generate an alert (e.g., warning, error/fault notification, etc.) and/or an instruction (e.g., repair instruction/message, control signal, etc.) based upon the diagnostic and usage information. In some embodiments, the aircraft server 310 may also be configured to generate alerts and/or instructions based upon the diagnostic and usage information (e.g., for errors/faults that can be corrected inflight or errors/faults that require the passenger to be relocated to prevent harm).

In some embodiments, the aircraft server 310 can also be configured to transmit at least some of the diagnostic and usage information to one or more mobile devices 336 (e.g., tablets, smartphones, notebook computers, wearable devices such as smart watches or activity trackers, etc.). For example, the aircraft server 310 can be configured to transmit the diagnostic and usage information (e.g., faults, errors, test data, usage data (e.g., usage statistics), user settings/preferences, current settings, any combination thereof, etc.) to a flight attendant mobile device 336 periodically, based upon a schedule, in response to triggering event (e.g., startup, restart, detected error/fault), and/or in response to a query/request received from the mobile device 336. In embodiments, the mobile device 336 can be configured with a mobile application ("App") that provides access to the diagnostic and usage information. The diagnostic and usage information can include status information, such as, but not limited to, safety belt status (e.g., buckled or unbuckled), chair position status (e.g., upright or reclined), passenger tray status (e.g., stowed or deployed), and so forth. This allows a flight attendant to conveniently monitor passenger statuses via the flight attendant's mobile device 336. Further, the mobile device 336 (via the App) may be configured to generate an alert (e.g., warning, error/fault notification, etc.) based upon the diagnostic and usage information, for example, for errors/faults that can be corrected inflight or errors/faults or statuses (e.g., unbuckled safety belt, etc.) that require flight attendant intervention.

Figure 5:
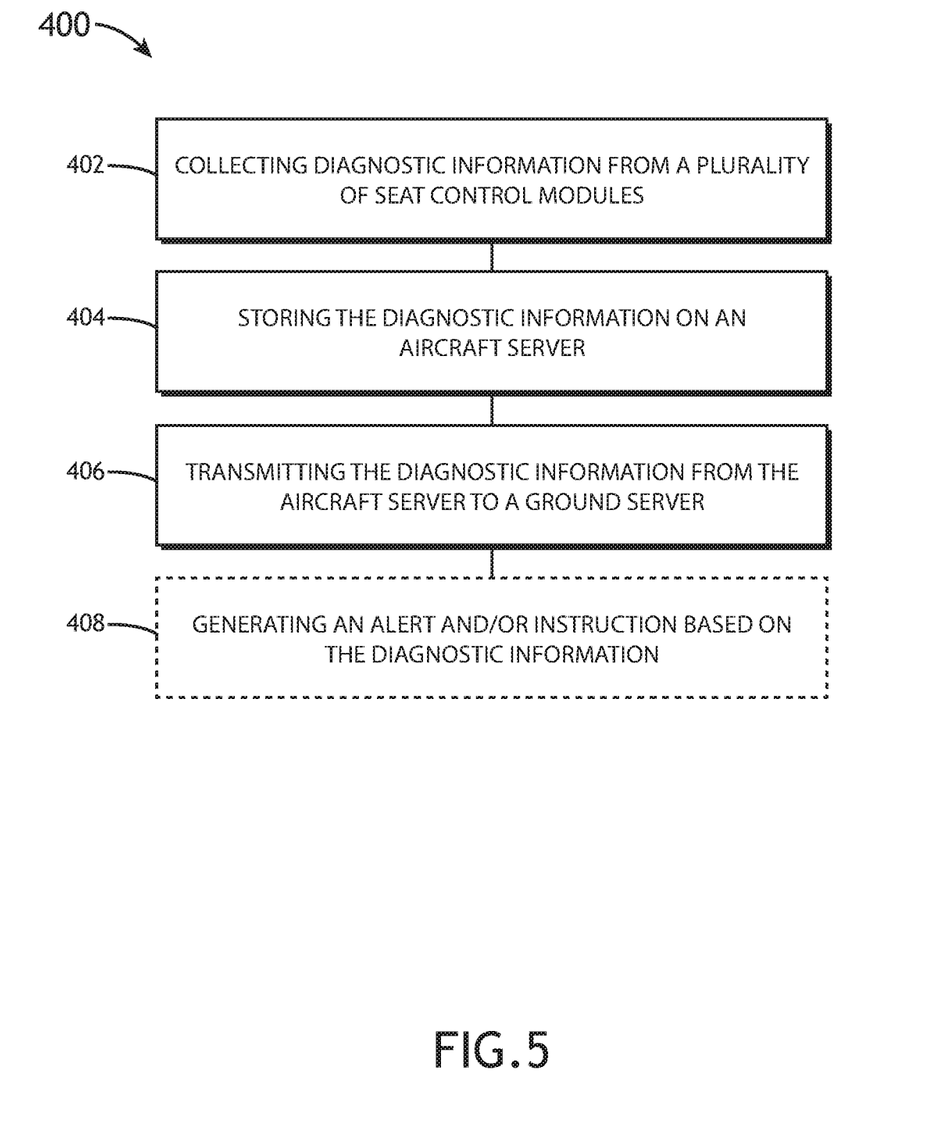
FIG. 5 is a flow diagram illustrating an example implementation of a method of monitoring passenger chair components.

FIG. 5 illustrates an example implementation of a method 400 that employs a system for monitoring passenger chair components, such as the system 300 described above. In general, operations of disclosed processes (e.g., method 400) may be performed in an arbitrary order, unless otherwise provided in the claims.

The method 400 includes collecting diagnostic and usage information from a plurality of seat control modules 206 communicatively coupled with components (e.g., PSU 202, PCM 204, the seat control module 206 itself, actuator(s) 214, lights and/or peripheral devices 216, passenger control unit 218, any combination thereof, etc.) of respective passenger chairs 102 (block 402). For example, IFE units 110 can be configured to collect diagnostic and usage information from the seat control modules 206 of respective passenger chairs 102 or respective groups of passenger chairs 206.

The diagnostic and usage information can be permanently or temporarily stored on an aircraft server 310 (block 404). For example, the diagnostic and usage information can be transmitted from the IFE units 110 to the aircraft server 310, which then stores the diagnostic and usage information (e.g., in memory 314). In an embodiment, each of the IFE units 110 is configured to transmit the information collected by the IFE unit 110 to the aircraft server 310. In another embodiment, a head/master IFE unit 328 may receive diagnostic and usage information collected by the other IFE units 110 and can be configured to then transmit the diagnostic and usage information to the aircraft server 310. In yet another embodiment, the seat control modules 206 can be communicatively coupled with the aircraft server 310 and configured to transmit the diagnostic and usage information to the aircraft server 310 (i.e., without routing the information through IFE units 110).

After the diagnostic and usage information has been collected and/or stored by the aircraft server 310, the diagnostic and usage information is transmitted to a ground server 318 (block 406). For example, the aircraft server 310 can be configured to transmit the diagnostic and usage information (e.g., faults, errors, test data, usage data (e.g., usage statistics), user settings/preferences, current settings, any combination thereof, etc.) to the ground server 318 periodically, based upon a schedule, in response to triggering event (e.g., startup, restart, detected error/fault), and/or in response to a query/request received from the ground server 318.

In some implementations, the method 400 further includes generating an alert and/or instruction based on the diagnostic and usage information (block 408). For example, the ground server 318 may be configured to generate an alert (e.g., warning, error/fault notification, etc.) and/or an instruction (e.g., repair instruction/message, control signal, etc.) based upon the diagnostic and usage information.

The method 400 may further include any step or operation implied or required by the embodiments of system 300 described herein. The system 300 can also include any additional component or functionality expressed or implied by the method 400.

It is to be understood that implementations of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some implementations, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for monitoring passenger chair components, comprising:
   a seat control module communicatively coupled with one or more components of a passenger chair;
   an inflight entertainment unit communicatively coupled to the seat control module, the inflight entertainment unit configured to receive diagnostic and usage information associated with the one or more components from the seat control module;
   an aircraft server communicatively coupled to the inflight entertainment unit, the aircraft server configured to receive the diagnostic and usage information from the inflight entertainment unit, the aircraft server further configured to transmit the diagnostic and usage information to a ground server; and
   a master inflight entertainment unit that communicatively couples the inflight entertainment unit to the aircraft server, wherein the master inflight entertainment unit is communicatively coupled to a respective seat control module of a master passenger chair that is different from the passenger chair associated with the inflight entertainment unit that is communicatively coupled to the seat control module, wherein the master inflight entertainment unit is also communicatively coupled to a plurality of inflight entertainment units that are communicatively coupled to a plurality of respective seat control modules, wherein the master inflight entertainment unit is configured to receive diagnostic and usage information associated with the plurality of respective seat control modules from the plurality of inflight entertainment units and is further configured to transmit the diagnostic and usage information from the plurality of inflight entertainment units to the aircraft server, and wherein the master inflight entertainment unit is further configured to receive diagnostic and usage information from the respective seat control module of the master passenger chair and is further configured to transmit the diagnostic and usage information of the master passenger chair to the aircraft server.

2. The system of claim 1, wherein the one or more components comprise at least one of: an actuator, a peripheral device, a light source, a passenger control unit, or a power control module.

3. The system of claim 1, wherein the inflight entertainment unit is integrated within the passenger chair.

4. The system of claim 1, wherein the inflight entertainment unit is integrated within another passenger chair.

5. The system of claim 1, further comprising:
   a secure server router that communicatively couples the inflight entertainment unit to the aircraft server.

6. The system of claim 1, further comprising:
   an aviation message router that communicatively couples the inflight entertainment unit to the aircraft server.

7. A system for monitoring passenger chair components, comprising:
   a plurality of seat control modules communicatively coupled with components of respective passenger chairs;
   a plurality of inflight entertainment units communicatively coupled to respective ones of the plurality of seat control modules, the plurality of inflight entertainment units configured to receive diagnostic and usage information associated with the components from the plurality of seat control modules;
   an aircraft server communicatively coupled to the plurality of inflight entertainment units, the aircraft server configured to receive the diagnostic and usage information from the plurality of inflight entertainment units;
   a master inflight entertainment unit that communicatively couples the plurality of inflight entertainments units to the aircraft server, wherein the master inflight entertainment unit is communicatively coupled to a respective seat control module of a master passenger chair that is different from the respective passenger chairs associated with the plurality of inflight entertainment units, wherein the master inflight entertainment unit is configured to receive diagnostic and usage information associated with the plurality of seat control modules from the plurality of inflight entertainment units and is further configured to transmit the diagnostic and usage information from the plurality of inflight entertainment units to the aircraft server, and wherein the master inflight entertainment unit is further configured to receive diagnostic and usage information from the respective seat control module of the master passenger chair and is further configured to transmit the diagnostic and usage information of the master passenger chair to the aircraft server; and
   a ground server communicatively coupled to the aircraft server, the ground server configured to receive the diagnostic and usage information from the aircraft server.

8. The system of claim 7, wherein the components comprise at least one of: actuators, peripheral devices, light sources, passenger control units, or power control modules.

9. The system of claim 7, further comprising:
   a secure server router that communicatively couples the plurality of inflight entertainment units to the aircraft server.

10. The system of claim 7, further comprising:
    an aviation message router that communicatively couples the plurality of inflight entertainment units to the aircraft server.

11. The system of claim 10, further comprising:
    another aviation message router that communicatively couples the aircraft server to the ground server.

12. The system of claim 7, wherein the ground server is configured to generate at least one of an alert or an instruction based on the diagnostic and usage information.

13. A method of monitoring passenger chair components, comprising:
    collecting diagnostic and usage information from a plurality of seat control modules communicatively coupled with components of respective passenger chairs, wherein the diagnostic and usage information is collected by a plurality of inflight entertainment units communicatively coupled to respective ones of the plurality of seat control modules;
    storing the diagnostic and usage information on an aircraft server, wherein the aircraft server is configured to receive the diagnostic and usage information from the plurality of inflight entertainment units via a master inflight entertainment unit that communicatively couples the plurality of inflight entertainments units to the aircraft server, wherein the master inflight entertainment unit is communicatively coupled to a respective seat control module of a master passenger chair that is different from the respective passenger chairs associated with the plurality of inflight entertainment units, wherein the master inflight entertainment unit is configured to receive diagnostic and usage information associated with the plurality of seat control modules from the plurality of inflight entertainment units and is further configured to transmit the diagnostic and usage information from the plurality of inflight entertainment units to the aircraft server, and wherein the master inflight entertainment unit is further configured to receive diagnostic and usage information from the respective seat control module of the master passenger chair and is further configured to transmit the diagnostic and usage information of the master passenger chair to the aircraft server; and transmitting the diagnostic and usage information from the aircraft server to a ground server.

14. The method of claim 13, wherein the aircraft server is configured to receive the diagnostic and usage information from the plurality of inflight entertainment units via at least one of a secure server router or an aviation message router that communicatively couples the plurality of inflight entertainments units to the aircraft server.

15. The method of claim 13, further comprising:

generating at least one of an alert or an instruction based on the diagnostic and usage information.

\* \* \* \* \*